US006671228B1

United States Patent
Griffin et al.

(10) Patent No.: US 6,671,228 B1
(45) Date of Patent: Dec. 30, 2003

(54) SONAR TRACKING ARRAY

(75) Inventors: Maurice J. Griffin, Tiverton, RI (US); Ira B. Cohen, Waterford, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 61 days.

(21) Appl. No.: 10/214,485

(22) Filed: Aug. 6, 2002

(51) Int. Cl.[7] .............................................. G01S 15/66
(52) U.S. Cl. ....................................... 367/153; 367/104
(58) Field of Search ................................. 367/104, 120, 367/129, 153, 103, 87, 88

(56) References Cited

U.S. PATENT DOCUMENTS

| | | | | |
|---|---|---|---|---|
| 3,886,491 A | * | 5/1975 | Jonkey et al. ............... 367/153 |
| 4,305,141 A | * | 12/1981 | Massa ......................... 367/105 |
| 4,656,616 A | * | 4/1987 | Bennett et al. .............. 367/153 |
| 5,163,026 A | * | 11/1992 | Peynaud ......................... 367/7 |
| 5,953,287 A | * | 9/1999 | Willacy et al. .............. 367/104 |

* cited by examiner

*Primary Examiner*—Ian J. Lobo
(74) *Attorney, Agent, or Firm*—James M. Kasischke; Michael F. Oglo; Jean-Paul A. Nasser

(57) ABSTRACT

A sonar array comprising a support structure, an acoustic projector attached to the support structure, and a plurality of directional hydrophones attached to the support structure and arranged so as to surround the acoustic projector. The directional hydrophones are equidistantly spaced about the acoustic projector. In one embodiment, the array includes means attached to the support structure that allows the support structure to be connected to a device that effects course steering of the sonar array.

5 Claims, 2 Drawing Sheets

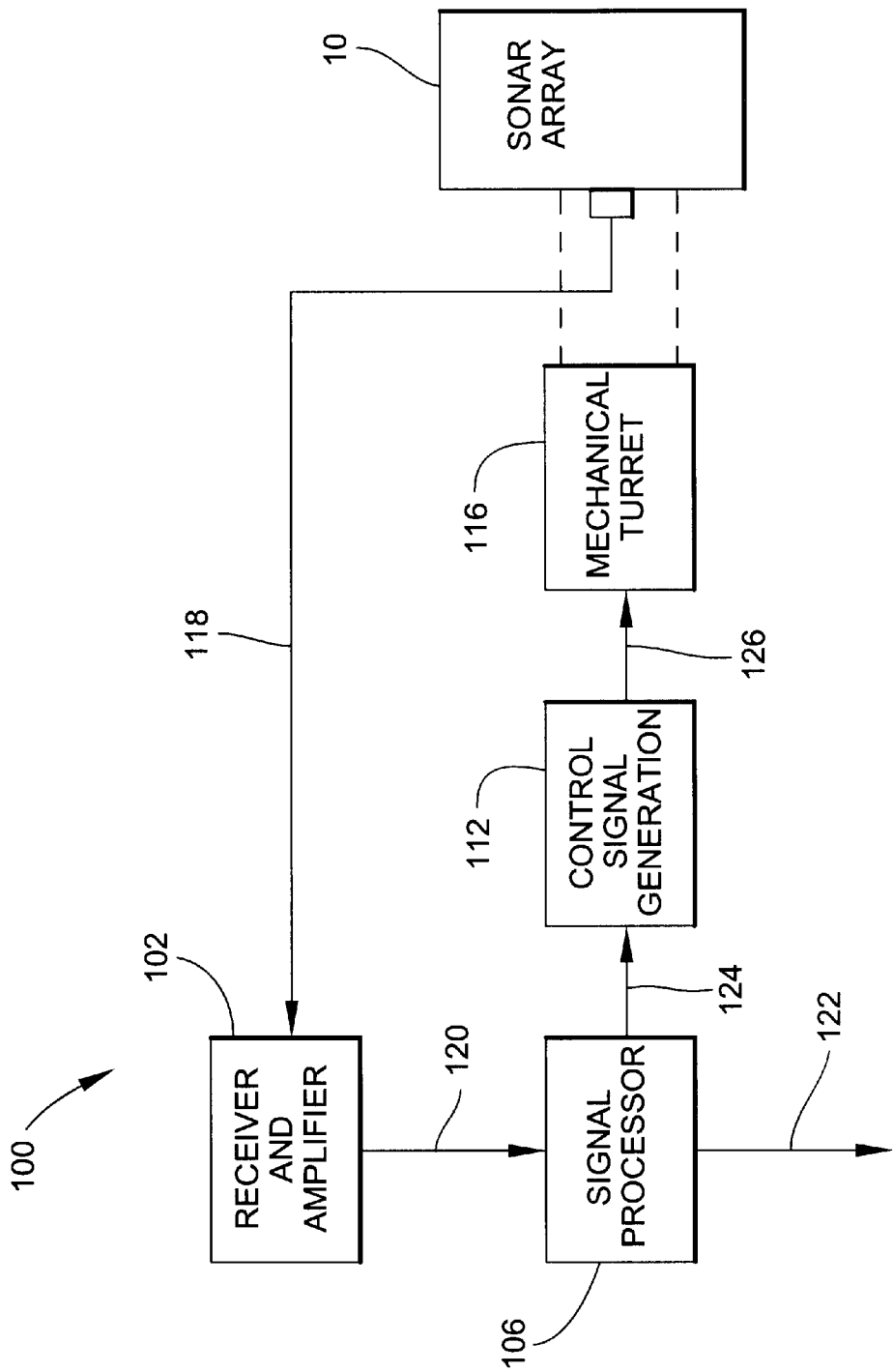

SONAR TRACKING ARRAY

STATEMENT OF GOVERNMENT INTEREST

The invention described herein may be manufactured and used by or for the Government of the United States of America for governmental purposes without the payment of any royalties thereon or therefor.

CROSS TO OTHER PATENT APPLICATIONS

Not applicable.

BACKGROUND OF THE INVENTION (1) Field of the Invention

The present invention generally relates to a sonar tracking array, and more particularly to a sonar tracking array for an active sonar system.

(2) Description of the Prior Art

Highly accurate sonar systems are continuously needed in today's military and oceanographic environments. However, many conventional active sonar systems that operate at relatively high frequencies utilize an extremely large amount of components. Conventional high-channel count arrays, even if sparsely populated, contain a very high number of elements that significantly increase costs related to manufacturing, installation, maintenance and repair. Conventional short baseline tracking systems are unable to achieve adequate signal-to-noise ratio without the use of transponders and responders. The bearing measurement accuracy achievable with a sonar array is dependent on both the physical aperture of the array and the signal-to-noise ratio (SNR). The extent of the aperture available for mounting sonar arrays on submarines is limited. Thus, alternatively, narrow sonar beam-widths and correspondingly high angular resolution with a given fixed aperture can be achieved by operating at shorter wavelengths. However, high frequency (short wavelength) operation has a severe drawback in that sound propagation loss increases dramatically as described by R. J. Urick in "Principles of Underwater Sound", McGraw Hill, New York, 1975, pages 99–102, which portion of a publication is incorporated herein in its entirety.

Receiver beamwidth is an expression of the angular sector within which the sonar tracking array responds to incident sounds. Outside the aforesaid angular sector, the response is severely attenuated. The 3 dB beamwidth of an array of sensors for a given uniformly shaded fixed aperture L is approximately represented by the equation $50\,\lambda/L$ wherein $\lambda$ is the wavelength in the transmission medium of the acoustic energy being generated. This concept is described by William S. Burdic in "Underwater Acoustic Systems Analysis", Prentice-Hall, Englewood Cliffs, N.J., 1991, page 310, which portion of a publication is incorporated herein in its entirety. If the array elements are spaced one-half wavelength apart, the number of elements across the aperture is then represented by the equation $2\,L/\lambda$. Thus, for a square array, the channel count is proportional to $L^2$.

What is needed is an improved sonar tracking array that is highly accurate but yet, is relatively less complex than conventional sonar tracking arrays. Another desirable feature of such an improved sonar tracking array is that it should have a relatively low per-unit-cost than conventional sonar tracking arrays.

SUMMARY OF THE INVENTION

It is therefore an object of the present invention to provide a sonar tracking array that is highly accurate but yet, is relatively less complex than conventional sonar tracking arrays.

Another object of the present invention is to provide a sonar tracking system that can operate at higher frequencies with relatively fewer hydrophone channels and yet achieve sufficient directivity.

A further object of the present invention is to provide a sonar tracking array that has a relatively lower per-unit-cost than conventional sonar tracking arrays.

The present invention is directed to a sonar array that is suitable for mounting to the exterior of a submarine. The sonar array exhibits relatively high accuracy but has a relatively low component and channel count. In a preferred embodiment, the sonar array is mechanically course steered in order to maintain the target within the main lobe response of the sonar array.

The sonar array of the present invention comprises a support structure, an acoustic projector attached to the support structure, and a plurality of directional hydrophones attached to the support structure and arranged so as to surround the acoustic projector. The directional hydrophones are spaced about the acoustic projector. In one embodiment, the array includes means attached to the support structure that allows the support structure to be connected to a device that effects course steering of the sonar array.

The sonar array of the present invention comprises a support structure, an acoustic projector attached to the support structure, and a plurality of directional hydrophones attached to the support structure and arranged so as to surround the acoustic projector. The directional hydrophones are spaced about the acoustic projector. In one embodiment, the array includes means attached to the support structure that allows the support structure to be connected to a device that effects coarse steering of the sonar array.

In one embodiment, all of the hydrophones are center-spaced from the acoustic projector by substantially the same distance.

In one embodiment, the plurality of hydrophones comprises four hydrophones.

In one embodiment, the outer diameter of the acoustic projector and each hydrophone is about 6.0 inches.

In one embodiment, each pair of successive hydrophones are center-spaced from each other by about 8.5 inches.

In a related aspect, the present invention is directed to a sonar tracking system, comprising a sonar array comprising a support structure, an acoustic projector attached to the support structure, and four directional hydrophones attached to the support structure and arranged so as to surround the acoustic projector. The directional hydrophones are spaced about the acoustic projector. The sonar tracking system further includes a mechanical turret for steering the sonar array. The turret has inputs for receiving control signals that control the movement of the turret. The sonar tracking array further includes means for receiving and processing sonar signals received from the hydrophones, and means, responsive to the processed acoustic signals, for generating the control signals for input into the mechanical turret.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 is a block diagram of a sonar system that utilizes the sonar tracking array of FIG. 1.

DESCRIPTION OF THE PREFERRED EMBODIMENT

Figure 1:
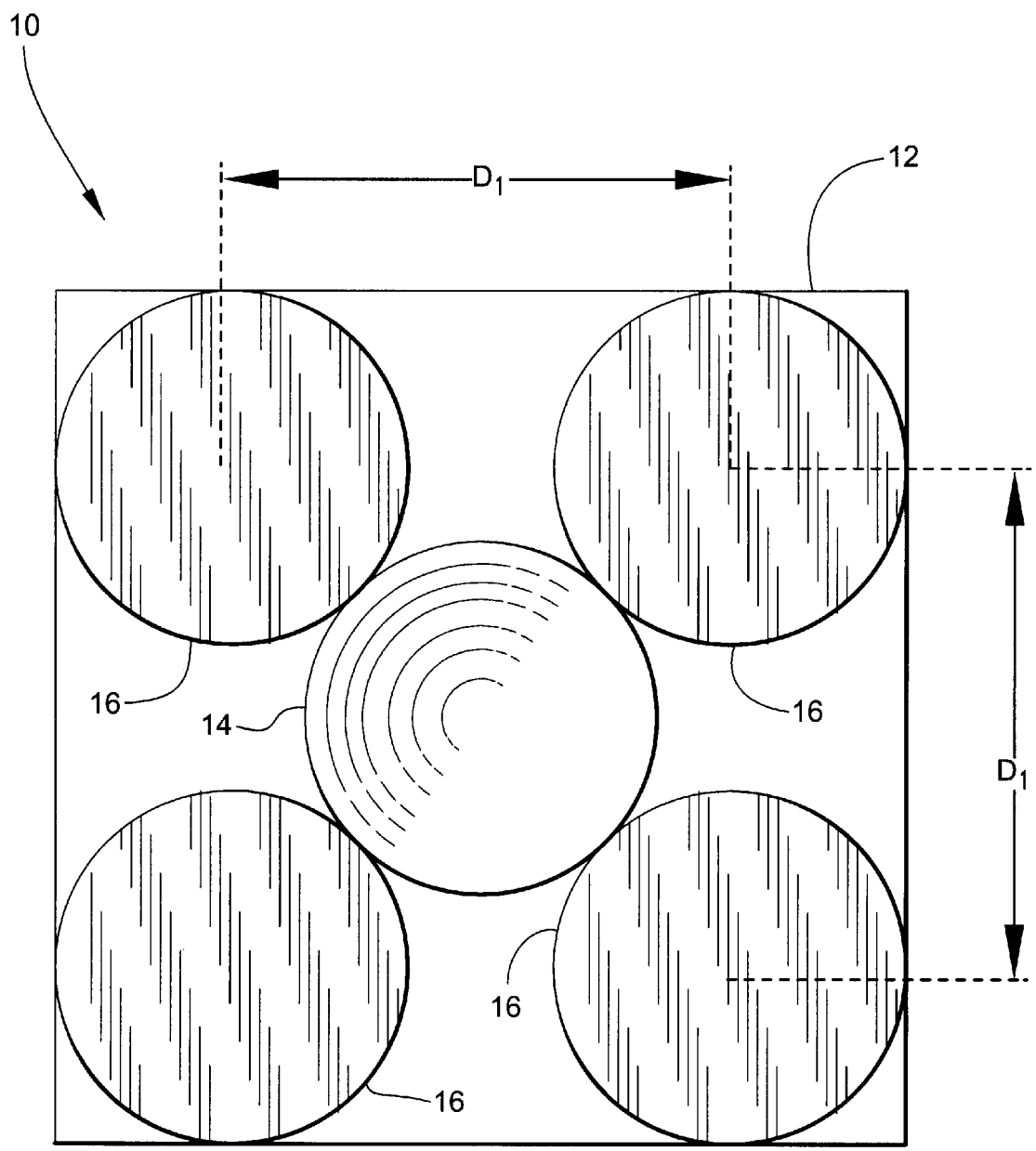
FIG. 1 is a side plan view of the sonar tracking array of the present invention.

In describing the preferred embodiments of the present invention, reference will be made herein to FIGS. 1–2 of the drawings in which like numerals refer to like features of the invention.

Referring to FIG. 1, sonar tracking array 10 generally comprises support structure 12, acoustic projector 14 and a plurality of directional hydrophones 16. Acoustic projector 14 and directional hydrophones 16 are securely mounted to support structure 12. However, acoustic projector 14 and hydrophones 16 are mounted to structure 12 in such a manner so as to enable projector 14 and hydrophones 16 to be dismounted for repair or replacement. In a preferred embodiment, hydrophones 16 are arranged so as to completely surround acoustic projector 14. In one embodiment, support structure 12 is configured as a rectangular-shaped or square-shaped stainless steel frame. However, other suitable structural configurations can be used to fabricate support structure 12. Furthermore, support structure 12 may be fabricated from other suitable materials. Support structure 12 is movably mounted to a submarine by use of a mechanically steered turret. However, this feature is discussed in detail in the ensuing description.

In one embodiment, the transducing face or surface of projector 14 has a generally convex, or more particularly, a parabolic shape. Acoustic projector 14 may have other geometrical configurations provided that acoustic projector is able to exhibit a beam pattern having the required width. In one embodiment, acoustic projector 14 has an outer diameter of about 6.0 inches. However, it is to be understood that acoustic projector 14 can have an outer diameter that is less than or greater than 6.0 inches.

In one embodiment, the transducing face or surface of each hydrophone 16 has a generally flat or planar shape. In another embodiment, each hydrophone 16 has a hemispherical geometry. However, it is to be understood that each hydrophone 16 may have other suitable geometrical shapes. In one embodiment, each hydrophone 16 has an outer diameter of about 6.0 inches. However, it is to be understood that each hydrophone 16 can have other outer diameters as well. In a preferred embodiment, each hydrophone 16 is center-spaced from the next or successive hydrophone 16 by a predetermined distance $D_1$. Thus, when four hydrophones 16 are used, as shown in FIG. 1, the angular separation of each hydrophone is about 90°. In one embodiment, the distance $D_1$ is about 8.5 inches. However, it is to be understood that distance $D_1$ can be greater or less than 8.5 inches. In one embodiment, the hydrophones are center-spaced from the acoustic projector by substantially the same distance.

The operational frequency range of sonar array 10 is between about 10 kHz and 100 kHz. The well known Product Theorem describes the combined overall response of sonar array 10. The Product Theorem is described by R. J. Urick in "Principles of Underwater Sound", McGraw Hill, N.Y., 1975, page 57, which portion of a publication is incorporated herein in its entirety. When comparing sonar array 10 to a fully populated, conventional sonar array, sonar array 10 reduces channel count by more than two orders of magnitude.

Acoustic projector 14 may be realized by a suitable commercially available acoustic projector manufactured by Edo Acoustics Corporation of Salt Lake City, Utah. Similarly, hydrophones 16 also may be realized by suitable commercially hydrophones manufactured by Edo Acoustics Corporation.

Referring to FIG. 2, there is shown system 100 which utilizes sonar array 10. System 100 generally comprises receiver/amplifier 102, signal processor 106, control signal generator 112 and mechanical turret 116. Acoustic signals 118 received from sonar array 10 are inputted into receiver/amplifier 102. Amplified acoustic signals 120 are inputted into processor 106. Processor 106 outputs processed acoustic signals 122 for input into peripheral sonar equipment (not shown) and processed acoustic signals 124 for input into control signal generator 112. Generator 112 converts processed acoustic signals 124 into control signals 126. Control signals 126 are inputted into inputs (not shown) of mechanical turret 116 so as to effect course steering of array 10 in order to maintain a tracked target in the main lobe of the response of array 10. As a result, split beam processing can be implemented to provide accurate bearing estimates. The directional capabilities of hydrophones 16 contributes to the suppression of the level of the side-lobes. Stated another way, the invention provides the advantage of operation at higher frequencies with fewer hydrophone channels, yet achieving the same directivity.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A sonar tracking system, comprising:
   a sonar array comprising a support structure, an acoustic projector attached to the support structure, four directional hydrophones attached to the support structure and arranged so as to surround the acoustic projector, the directional hydrophones being spaced about the acoustic projector; and
   a mechanical turret for steering the sonar array, the turret having inputs for receiving control signals that control the movement of the turret;
   means for receiving and processing sonar signals received from the hydrophones; and
   means, responsive to the processed acoustic signals, for generating the control signals for input into the mechanical turret.

2. The sonar tracking system according to claim 1 wherein each directional hydrophone has an outer diameter of about 6.0 inches.

3. The sonar tracking system according to claim 1 wherein the acoustic projector has an outer diameter of about 6.0 inches.

4. The sonar tracking system according to claim 1 wherein each pair of successive hydrophones are center-spaced from each other by a predetermined distance.

5. The sonar tracking system according to claim 4 wherein the predetermined distance is about 8.5 inches.

* * * * *